June 22, 1954 R. A. PALMER 2,681,508
SIGHTING DEVICE
Filed Sept. 11, 1952
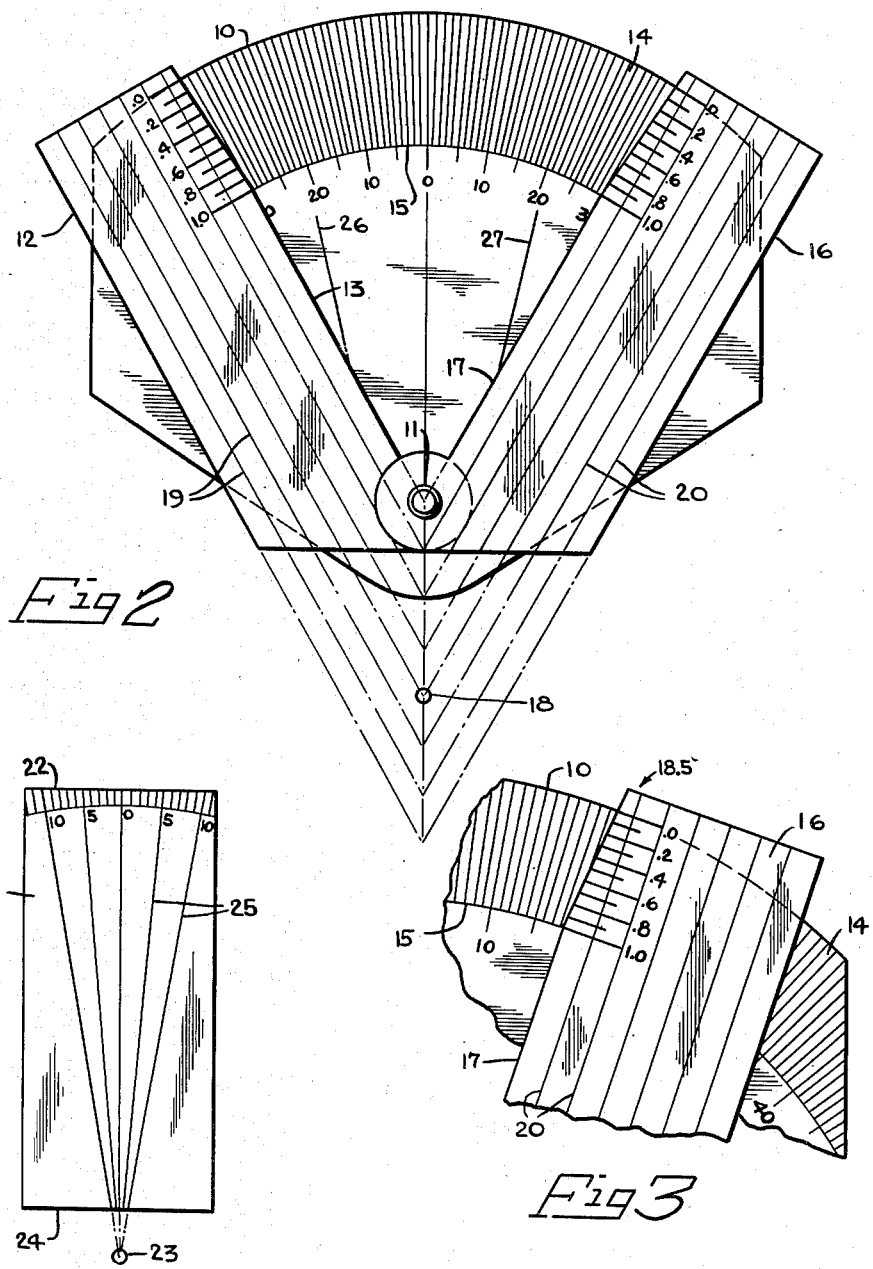
INVENTOR.
RALPH A. PALMER
BY Edward Thomas
ATTORNEY

Patented June 22, 1954

2,681,508

UNITED STATES PATENT OFFICE 2,681,508

SIGHTING DEVICE

Ralph A. Palmer, St. Joseph, Mich.

Application September 11, 1952, Serial No. 308,955

4 Claims. (Cl. 33—64)

This invention relates to sighting devices suitable for the measurement of angles between lines of sight to near or distant objects or landmarks, and may be regarded as a novel form of protractor in which a scale usually of degrees, indicates angles with an affective apex at the observer's eye.

Devices for measuring angles between lines of sight to objects as seen by an observer are well known, and are widely used in navigation and surveying, for fixing positions and as an aid in making charts and maps.

Such devices, as used in work requiring high precision, are relatively expensive, delicate, cumbersome and require considerable training and skill for their most effective use. They commonly include expensive optical glass, means of adjustment, and a fixed or movable base for positioning on the ground or on shipboard. They measure angles between lines which intersect at a fixed point within the instrument.

According to the present invention it is possible to replace these more expensive, delicate and cumbersome but precise instruments with a much less expensive, less delicate, lighter, and more easily carried and more easily used instrument with accuracy adequate for a number of uses, such as navigation of small craft within sight of land.

In one of the two forms shown the angle measured is shown on an index on the arc of a circle about a center occupied by the eye when the instrument is in use. The material of the protractor in the vicinity of this center is cut away so that the user can hold it before his face with his eye at the center of the arc of the index.

In an alternative form one or more arms pivoted at a protractor center provide for sighting guide lines intersecting at an angle position beyond the back edge of the protractor, the angle between those lines being measured by a line on the arm parallel to the sighting guide line and intersecting the other sighting guide line on the protractor base at the pivot point.

A further refinement of this form provides an exaggerated scale to facilitate interpolation of readings to fractional parts of a degree.

Both forms are based on recognition that the angular range of vision of the normal human eye, with the head in one position, is wide enough to be significant; that angles between lines of sight from the eye are readily measurable over the surface of a protractor adapted to be held in proper position; and that such measurement is useful for navigation and other purposes, as in the three-point problem or solution outlined by Bowditch in "American Practical Navigator."

Thus, a simple, economical, easily carried, and easily used device enables the angles between lines of sight from the eye to selected landmarks to be read rapidly and with accuracy adequate for a variety of purposes.

Other features and advantages will hereinafter appear.

In the accompanying drawings:

Fig. 1 shows a simple, one-piece, fixed line form of device;

Fig. 2 shows in plan view a form of the invention, with pivoted arms carrying one scale-reading line each, and parallel thereto several sighting guide lines;

Fig. 3 shows in plan view the modification of one of the pivoted arms of Fig. 2, to facilitate interpolation of angle readings to fractional parts of one degree.

The form shown in Fig. 1 is constructed of one piece 21 of rigid or semi-rigid sheet material such as ordinarily used in making common draftsmans' protractors. It has no moving parts. Its edges may be straight or variously curved as they are not critical to use of the device. One of its surfaces 22 is indexed to measure degrees about a point 23 beyond the rear edge 24 of the device. In use this point 23 is the eye position.

Indexes at convenient intervals, such as 5 or 10 degrees, are extended at 25 the length of the protractor or for several inches, as radii from point 23. These serve as sighting guide lines, to show when the device is held in the proper position for use, with the degree index lines at the proper distance from the eye to correctly measure angles between lines of sight from the eye. It is in correct position when the eye can look straight along two or more such lines in quick succession without change of position of the device or the user's head. A few such sighting guide lines serve the purpose. Having many of them close together, as for every degree or every second degree, proves too confusing to the eye of the user.

With the device in correct position as indicated above, one sighting guide line 25 may be brought to coincide with or lie directly under the line of sight to any desired object. The line of sight to a second object will then be seen as passing directly over one of the degree index marks or between two of them. The angle at the eye between the two lines of sight can then be read from the scale to the nearest degree, and fractional parts of a degree may be noted approximately by visual interpolation, if desired. For most uses and use conditions reading to the nearest degree will be within the limits of accuracy of the sightings, and provide satisfactory results.

Thus a method of use has been worked out in which the use of lines of sight separated by comparatively small or acute angles at the eye favors accuracy and is suited to most use conditions. This also makes it practicable to limit the range of the degree scale to 40 degrees or less, and to utilize a relatively long and narrow shape of the device adapted to easy carrying in a pocket or otherwise.

The degree index lines and sighting guide lines 25 may be cut into the surface of the device, raised above it, or otherwise distinctively marked to increase their visibility when as in use, they are pointed directly or almost directly at the eye.

In the form shown in Fig. 2, a plane table or protractor 10 which may be a sheet of cardboard, plastic, or metal, carries pivoted at 11, an adjustable arm 12 having an edge 13 along a radius from the pivot 11, and indicating angles on a scale of degrees 14 marked on a circle struck from the pivot 11. The scale of degrees 14 is preferably numbered in either direction from a center zero index which is also extended through the pivot point 11, as a base sighting guide line.

An optional second arm 16, also pivoted at 11, has an edge 17, along a radius from the pivot 11, and also indicates angles usually on another part of the scale 14.

Thus the scale 14 provides for the reading of angles in either or both directions from the zero sighting guide line as set off at the pivot point 11 by the pivoted arms 12, 16, the scale 14 being read at the movable arm edges 13 and 17. Angles at the pivot point 11 set off by edges 13 and 17 of the two pivoted arms may also be read as the sum of the degrees read on the scale to either side of the zero sighting guide line.

The eye of an observer cannot be placed at the pivot point 11, but is placed back of that point at 18 on the prolongation of zero sighting guide line. From that approximate point it can readily also sight along one or another of the sighting guide lines 19 parallel to radius edge 13 on pivoted arm 12, when that arm is positioned at an acute angle in the range from zero to approximately 60 degrees to the right of the zero sighting guide line. With the eye at the eye position 18 the sighting guide lines 19 and 20 can easily be brought to coincide with any two lines of sight from the eye. Radius edge line 13 and the sighting guide lines on the same pivoted arm being parallel, those lines or their prolongations intersect the zero sighting guide line at equal angles. The desired measure of the angle between lines of sight intersecting at eye position can therefor be read on scale 14 showing the equal angle at pivot point 11 between zero sighting guide line and radius edge line 13 or 17.

Fig. 3 shows an adaptation of the pivoted arm form, Fig. 2, to provide for reading to fractional parts of a degree. The outer ends of edges 13 and 17 are slanted to intersect one degree of arc on the scale, the distance between degree marks along the slant being considerably greater than the arc distance between adjacent degree marks is shown as graduated in tenths. Thus, as the pivoted arm is moved slowly from one whole degree reading to the next, it is evident that $\tfrac{1}{10}$ degree readings appear in succession as the fractional graduations on the slanted edge successively intersect the degree index mark next above the highest whole degree measured.

Both forms of the device are preferably cut off at their rear edges at such a point that the eye of the observer lies clear but comfortably close to the edge in making an observation along the sighting guide lines.

If desired, the surface 10 may carry two fixed lines 26 and 27 in addition to the zero sighting guide line and set at such an angle that they intersect, if prolonged, at the proper eye position 18, thus enabling an inexperienced user to readily find the proper eye position.

Having thus described certain forms of the invention in some detail, what is claimed is:

1. The combination with a sheet of material having front and back edges, of a series of gradations indicating angular degrees along one of said edges, a sighting device including a top face, a pivot on said sheet near the opposite one of said edges on which the device turns to indicate various of said gradations, and ruled lines on said top face pointing behind the pivot and adapted to be selectively viewed by a human eye near the pivot to align the sighting devices by a ruled line on an object to one side of the pivot as seen by the eye.

2. The combination with a sheet of material having front and back edges, of a series of gradations indicating angular degrees along one of said edges, a pair of sighting devices each including a top face, a pivot on said sheet near the opposite one of said edges on which the two devices turn independently of each other, and ruled lines on each of said top faces pointing behind the pivot and adapted to be selectively viewed by a human eye near the pivot where two of said lines intersect so as to align said devices on spaced objects and indicate on said gradations by said devices the angular spacing of said objects without moving the eye from said intersection.

3. The combination with a sheet of material having front and back edges, of a series of gradations indicating angular degrees along one of said edges, a pair of sighting devices each including a top face, and an edge sweeping over said degrees, a pivot on said sheet near the opposite one of said edges on which the two devices turn independently of each other, and ruled lines on each of said top faces pointing behind the pivot and adapted to be selectively viewed by a human eye near the pivot where two of said lines intersect so as to align said devices on spaced objects and indicate by said device edges on said gradations the angular spacing of said objects without moving the eye from said intersection.

4. The combination with a sheet of material having front and back edges, of a series of gradations indicating angular degrees along one of said edges, a sighting device including a top face, a pivot on said sheet near the opposite one of said edges on which the device turns to indicate various of said gradations, and ruled lines on said top face pointing behind the pivot and adapted to be selectively viewed by a human eye near the pivot to align the sighting device by a ruled line on an object to one side of the pivot as seen by the eye, and a pair of fixed lines on said sheet pointing to behind said pivot to said point of intersection to enable the viewer by using the eye to locate said eye at the point of said intersection.

References Cited in the file of this patent

UNITED STATES PATENTS

| Number | Name | Date |
| --- | --- | --- |
| 2,880 | Benton | Dec. 12, 1842 |
| 552,261 | Rafferty | Dec. 31, 1895 |
| 881,826 | Rabone | Mar. 10, 1908 |
| 1,532,297 | Bausch et al. | Apr. 7, 1925 |
| 2,408,571 | Mitchell | Oct. 1, 1946 |
| 2,441,636 | Kaufman et al. | May 18, 1948 |

FOREIGN PATENTS

| Number | Country | Date |
| --- | --- | --- |
| 473,069 | France | Sept. 5, 1914 |
| 190,962 | Germany | Nov. 9, 1907 |
| 826,444 | France | Jan. 4, 1938 |